United States Patent
Baszucki (10) Patent No.: US 10,699,462 B1
(45) Date of Patent: Jun. 30, 2020

(54) CHARACTER MORPHING SYSTEM

(71) Applicant: Roblox Corporation, San Mateo, CA (US)

(72) Inventor: David B. Baszucki, Portola Valley, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 15/660,704

(22) Filed: Jul. 26, 2017

(51) Int. Cl.
   *G06T 13/40* (2011.01)
   *G06T 13/20* (2011.01)
   *G07F 17/32* (2006.01)

(52) U.S. Cl.
   CPC ............ *G06T 13/40* (2013.01); *G06T 13/205* (2013.01); *G07F 17/3272* (2013.01); *G06T 2210/44* (2013.01)

(58) Field of Classification Search
   None
   See application file for complete search history.

(56) References Cited

U.S. PATENT DOCUMENTS

| | | | | |
|---|---|---|---|---|
| 2005/0251553 | A1* | 11/2005 | Gottfried | G06Q 30/0277 709/204 |
| 2008/0045283 | A1* | 2/2008 | Stamper | A63F 13/10 463/1 |
| 2009/0058862 | A1* | 3/2009 | Finn | G06T 13/40 345/473 |
| 2010/0331084 | A1* | 12/2010 | Fuzell-Casey | A63F 13/69 463/31 |
| 2012/0071244 | A1* | 3/2012 | Gillo | A63F 13/00 463/42 |
| 2013/0044106 | A1* | 2/2013 | Shuster | G06T 19/20 345/419 |
| 2016/0027200 | A1* | 1/2016 | Corazza | G06T 13/40 345/420 |
| 2017/0061704 | A1* | 3/2017 | Gewicke | G06T 19/006 |

* cited by examiner

*Primary Examiner* — Xiao M Wu
*Assistant Examiner* — Steven Z Elbinger
(74) *Attorney, Agent, or Firm* — Lowenstein Sandler LLP (57) ABSTRACT

A system and method that detects a first access to a first game of an online gaming system by a first user that is associated with a character, wherein the character comprises a plurality of components. The method also determines whether first morphing settings are associated with the first game. Responsive to determining the first morphing settings are associated with the first game, the method generates a first morphed character based on the first morphing settings. The method provides the first morphed character for presentation in the first game via a user interface.

19 Claims, 5 Drawing Sheets

CHARACTER MORPHING SYSTEM

TECHNICAL FIELD

This disclosure relates to the field of collaboration platforms and, in particular, morphing characters of the collaboration platform.

BACKGROUND

Collaboration platforms allow users to connect to and share information with each other via the Internet. Users of a collaboration platform, such as a gaming platform, may participate in multi-user gaming environments, design custom gaming environments, decorate avatars, or exchange virtual items with other users, and so forth.

DESCRIPTION OF DRAWINGS

Various implementations of the present disclosure will be understood more fully from the detailed description given below and from the accompanying drawings of various implementations of the disclosure.

DETAILED DESCRIPTION

Collaboration platforms, such as gaming platforms, offer a variety of ways for users to interact with one another. For example, users of a gaming platform may work together towards a common goal, share various gaming items, send electronic messages to one another, and so forth. Users of a collaboration platform may play games (e.g., playing users) with characters or create games with developmental tools via the collaboration platform. A playing user may indulge their creativity by choosing, creating, or customizing characters that are used during gameplay in one or more games of the collaboration platform. The playing user's character may have particular character settings that are used to render the unique appearance of the character. Other users, such as creating users (e.g., owning users), may create immersive games where playing users may interact with elements of the game using characters. In some systems, creating users may have limited choices in determining the appearance of characters for a particular game. For instance, the creating user may not be able the change the appearance of the characters that the playing user selects to play a particular game. The lack of choices may inhibit a creating user's ability to implement their ideas and further inhibit the experiences of the playing users.

Aspects of the present disclosure address the above-mentioned and other challenges by allowing creating users to submit morphing settings for a particular game, where the morphing settings change one or more components of a playing user's character. In one implementation, a playing user using a user-selected character may access a game created by the creating user. The collaboration platform may detect the access and determine whether morphing settings submitted by the creating user are associated with the game. Responsive to determining that morphing settings are associated with the game, collaboration platform generates a morphed character based on the morphing settings (and character settings) and provides the morphed character for presentation in the first game via the user interface.

In some implementations, the morphed character includes some components that are transformed based on the morphing settings and other components based on the character settings. For example, the morphing settings may change the scale of some components of the character (e.g., lengthen the arms, legs, or torso) but keep other components (e.g., that are defined by the character settings that are selected by the playing user) that make the character distinctive or recognizable (e.g., face, hair, clothing, etc.).

By allowing creating users greater granularity of control of the appearance of playing users' characters, as disclosed herein, is advantageous because it provides a platform that enables greater creativity and further immersion of users into the collaboration platform, which improves an overall user experience with the collaboration platform, and increases the content consumed (e.g., time using the collaboration platform) by users of the collaboration platform. Further, aspects of the present disclosure result in increased flexibility of the collaboration platform at least because creating users may use existing resources (e.g., computational (processing) resources) to control game creation and game content. In addition, aspects of the present disclosure result in significant reduction of storage resources and significant reduction of computational (processing) resources at least because providing a creating user the ability to control morphing settings or morphing playing users' characters based on the morphing settings is faster and more efficient than conventional systems, for example.

It may be noted that a collaboration platform described as a gaming platform herein is provided for purposes of illustration, rather than limitation. A collaboration platform may be one or more of numerous platforms, such as a social networking platform, purchasing platform, a messaging platform, creation platform, and so forth.

Figure 1:
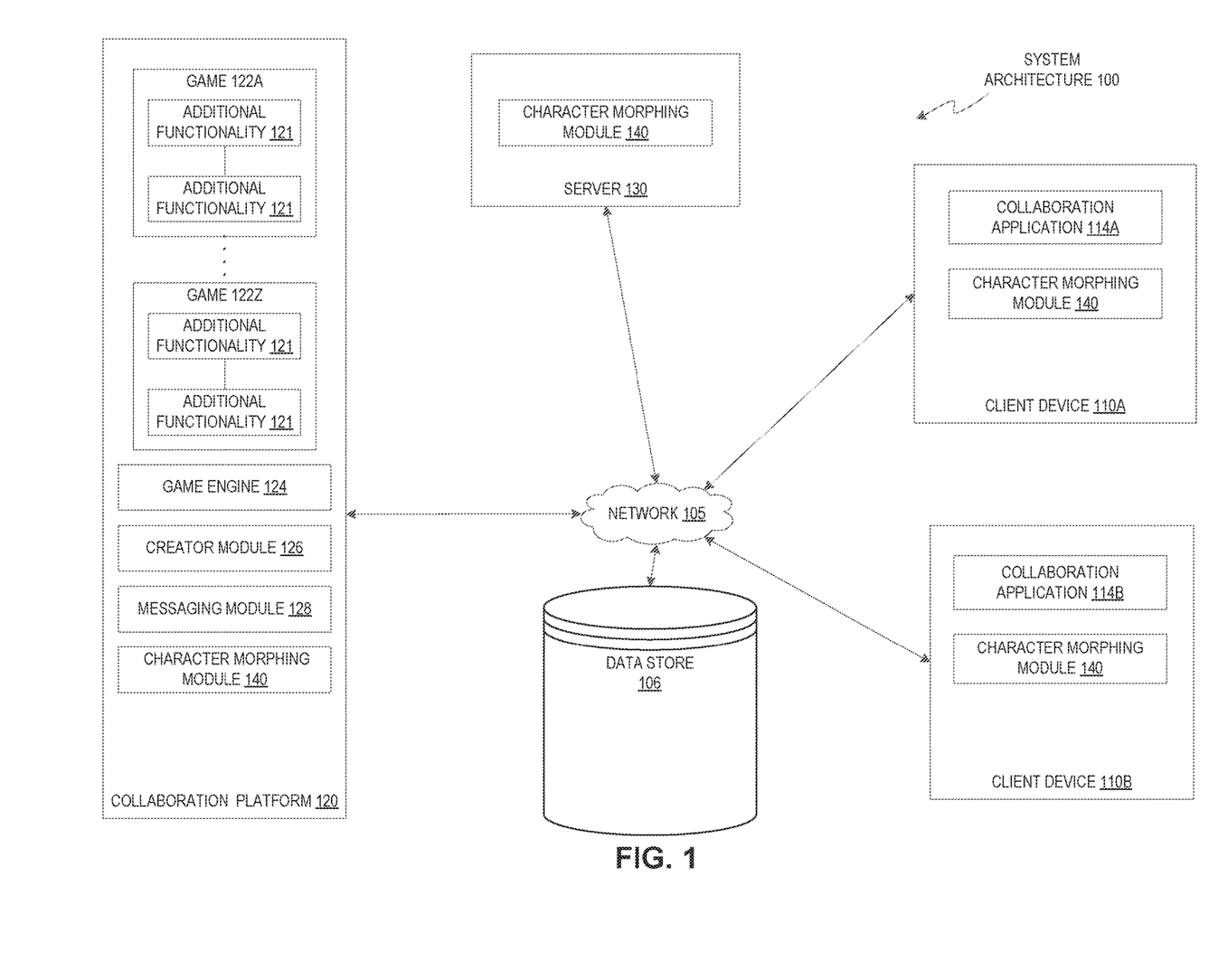
FIG. 1 illustrates an example system architecture, in accordance with implementations of the disclosure.

FIG. 1 illustrates an example system architecture 100, in accordance with one implementation of the disclosure. The system architecture 100 (also referred to as "system" herein) includes client devices 110A and 110B, a network 105, a data store 106, a collaboration platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In implementations, the server 130 may be one or more computing devices (e.g., a rackmount server, a server computer, etc.). In implementations, the server 130 may be included in the collaboration platform 120, be an independent system or be part of another system or platform. The server 130 may include character morphing module 140.

In some implementations, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to collaboration platform 120. The collaboration platform 120 may also include a website (e.g., a webpage) or application back-end software that may be used to provide a user with access to content provided by collaboration platform 120.

In implementations, collaboration platform 120 may be a type of social network providing connections between users. In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a game 122 or component of a game 122 of the collaboration platform 120.

In one implementation, collaboration platform 120 may be a gaming platform. For example, the gaming platform may provide single-player or multi-player games to a community of users that may access or interact with the games 122A-122Z using client devices 110. In implementations, games 122 (also referred to as "video game," "online game," or "virtual game" herein) may be two-dimensional (2D) games, three-dimensional (3D) games, virtual reality (VR) games, or augmented reality (AR) games, for example. In implementations, a game 122 may be played in real-time with other user of the game 122. A game 122 can include an electronic file that can be executed or loaded using software, firmware or hardware configured to present the game content (e.g., digital media item) to an entity. In some implementations, collaboration platform 120 hosts games 122 and allows users to interact with the games 122 using collaboration application 114 of client device 110. Users of collaboration platform 120 may play, create, interact with, or build games 122, or create and build contents of games 122. For example, users may create characters, decoration for the characters, one or more virtual environments for an interactive game, or build structures in a game, for example. In implementations, users may buy, sell, or trade game items, such as in-platform currency (e.g., virtual currency), with other users of the collaboration platform 120. In implementations, collaboration platform may transmit game content to collaboration applications 114. Game content (also referred to as "content") may refer to any data or software instructions (e.g., in-game items, user information, video, images, commands, etc.) associated with collaboration platform 120 or collaboration applications 114.

It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity.

In one implementation, collaboration platform 120 may consolidate the game content from the client devices 110 and transmit the consolidated game content (e.g., gaming video, rendering commands, user input, graphics library commands, etc.) to each of the client devices 110 to display interactions of the multiple users in a multi-player gaming environment. In another implementation, collaboration platform 120 may transmit the game content from the one or more client devices 110 to another client device for the other client device to consolidate and display the game content. In another implementation, the collaboration platform 120 may receive the game content (e.g., first user transmitting user input via client device 110A and second user transmitting user input via client device 110B), generate game results (e.g., first user beats second user), and transmit the game results to the client devices 110.

In some implementations, a game 122 may be associated with a particular user or particular group of users (e.g., a private game), or made widely available to users of the collaboration platform 120 (e.g., a public game). In implementations, where collaboration platform 120 associates one or more games 122 with a specific user or group of users, collaboration platform 120 may associated the specific user(s) with a game 122 using user account information (e.g., a user account identifier such as username and password).

In some implementations, collaboration platform 120 may include a game engine 124. In implementations, game engine 124 may be used for the development or execution of games 122. For example, game engine 124 may include a rendering engine ("renderer") for 2D, 3D, VR, or AR graphics, a physics engine or collision detection (and collision response), sound, scripting, animation, artificial intelligence, networking, streaming, memory management, threading, localization support, scene graph, or video support for cinematics.

In implementations, collaboration platform 120 may include a creator module 126. In implementations, creator module 126 may allow users to become creators to design or create environments in an existing game 122 or create new games or create new items within games or environments. In some implementations, a game 122 may have a common set of rules or common goal, and the environments of a game 122 share the common set of rules or common goal. In implementations, different games may have different rules or goals from one another. In some implementations, games may have one or more environments (also referred to as "gaming environments" or "virtual environment" herein) where multiple environments may be linked. For example, a user may build a virtual environment that is linked to another virtual environment created by another user. A character of the virtual game may cross the virtual border to enter the adjacent virtual environment. In implementations, items may refer to objects that are used, created, shared or otherwise depicted in games 122 of the collaboration platform 120. For example, items may include a character, tools, clothing, buildings, vehicles, currency, and so forth.

In implementations, creator module 126 may allow a user to create, modify, or customize characters. In implementations, characters are constructed from components, one or more of which may be selected by the user, that automatically join together to aid the user in editing. One or more characters (also referred to as an "avatar" or "model" herein)

may be associated with a user (also referred to as a "playing user" herein) where the user may control the character to facilitate a user's interaction with the game 122. In implementations, a character may include components such as body parts (e.g., hair, arms, legs, etc.) and accessories (e.g., t-shirt, glasses, decorative images, tools, etc.). In implementations, body parts of characters that are customizable include head type, body part types (arms, legs, torso, and hands), face types, hair types, skin types, among others. In implementations, the accessories that are customizable include clothing (e.g., shirts, pants, hats, shoes, glasses, etc.), weapons, or other tools. In implementations, the user may also control the scale (e.g., height, width, or depth) of a character or the scale of components of a character. In implementations, the user may control the proportions of a character (e.g., blocky, anatomical, etc.).

In some implementations, a component, such as a body part, may be a primitive geometrical shape such as a block, a cylinder, a sphere, etc., or some other primitive shape such as a wedge, a torus, a tube, a channel, etc. In implementations, creator module 126 may publish a user's character for other users of collaboration platform 120 to view or select. It some implementations, creating, modifying, or customizing characters may be performed by a user using a user interface and with or without scripting (or without an application programming interface (API)). It may be noted that for purposes of illustration, rather than limitation, characters are described as having a humanoid form. In may further be noted that characters may have any form such as a vehicle, animal, inanimate object, or other creative form.

In implementations, collaboration platform 120 may store characters created by users in data store 106. In implementations, the collaboration platform 120 maintains a character catalog and game catalog that may be presented to users via collaboration application 114. A user may select a game 122 from the game catalog to play. In implementations, the game catalog includes images of games stored on collaboration platform 120. In addition, a user may select a character (created by the playing user or other user) from the character catalog to participate in the chosen game. The character catalog includes images of characters stored on the collaboration platform 120. In implementations, one or more of the characters in the character catalog may have been created or customized by the user. In implementations, the chosen character may have character settings defining one or more of the components of the character.

In implementations, a user's character includes a configuration of components, where the configuration and appearance of components and more generally the appearance of the character may be defined by character settings. In implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by collaboration platform 120.

In implementations, creator module 126 includes a unique personal build and publishing service for creating and administering games 122 and gaming environments on the Internet that allows users (also referred to as "creating users," "creators," "owners," or "owning users" herein) to create, own, or administer games 122 and gaming environments using cloud-mediated computational resources, for example. In implementations, collaboration platform 120 executing creator module 126 includes a user-interfacing website or application (e.g., collaboration application 114) where users may access online computational resources hosted by collaboration platform 120 for the purposes of building, administrating, editing, and interacting with personally owned games 122 or gaming environments. In implementations, creator module 126 includes tools available to users for creating and instantiating three-dimensional virtual games or environments. In implementations, creator module 126 is available to users that wish to create and administer their own private virtual game 122. In implementations, a user may access creator module 126 using collaboration application 114.

In implementations, creator module 126 may provide control of created games 122 and environments to owning users who may set administrative policy regarding who will be allowed to interact with the created game 122 or environment and who has the capability of modifying, editing, or interacting with the game 122 or environment. Users with administrative control may also be referred to as owning users herein, unless otherwise specified. In some implementations, administrative rules can be granular to the point of specifying various levels of interaction, modification, or editing capabilities for certain individuals who might be recruited or otherwise desire to interact with the game 122 or gaming environment. For example, individuals may be recruited from friends in collaboration platform 120 or friends from social networks or in other collaborative or group associated online venues. In implementations, creator module 126 has administrative tools for setting such policies including or in addition to general rules for interaction within the game 122 or gaming environment.

In implementations, collaboration platform 120 may include character morphing module 140. As further described herein, character morphing module 140 via morphing settings may allow a user, such as an owning user, of collaboration platform 120 to control the appearance of characters in a game 122 or environment for which the user is the owning user. For example, an owning user may use character morphing module 140 to modify the settings (e.g., morphing settings) of the owning user's game so that components of characters entering the owning user's game are morphed in a manner specified by the owning user.

In a multi-owner gaming system, such as collaboration platform 120, each owner may control the morphing setting of their respective games 122 in implementations. In some implementations, one or more owning users may desire to have completely open games where users' exact characters are allowed to come into a game without morphing (e.g., generated entirely using the character settings). In implementations, the owning user of a game 122 may have a control panel, such as a user interface that allows the owning user to choose which components of a character are morphed and which components are unchanged (e.g., rendered using character settings).

In implementations, responsive to detecting playing users entering the owning user's game, collaboration platform 120 may determine the owning user's morphing settings, generate a morphed character, and provide the morphed character for presentation in the game. In implementations, the playing user may have one or more user selected components that help distinguish the playing user's character from other users' characters, for example. For example, the playing user may select the hair, clothing, face, and skin color of the playing user's character, the selection of which may be stored in the character settings. In implementations, the morphed character may keep one or more components of the playing user's character that distinguish the playing user's characters from others. For example, an owning user may develop a first-person shooter game where the morphing settings are set so that every character that enters the game is anatomically accurate and has the same height, size, and shape, wears military clothing but retains the specific head and face of the user's character. In some implementations, collaboration platform 120 may prevent some components of playing users from being morphed. Character morphing module 140 will be further described with respect to the subsequent FIGS. 2-4. Server 130 or client devices 110 may also implement character morphing module 140. In implementations, collaboration application 114 of client devices 110 may include character morphing module 140.

In some implementations, a playing user may have a character with character settings that give the character a unique identity. For example, the user may start with a blocky model (e.g., a block body model that includes head, hands, feet, arms legs, etc.) and customize components of the model to create a unique look (e.g. customize with a personalized t-shirt, a specific face, and a personalized hair color and hair style). The user (or collaboration platform 120) may identify some character settings (e.g., character settings that make the character unique) and lock the identified character settings. Locked character settings may help maintain the appearance of customized components as the character participates in different games with different morphing settings. In implementations, a user may use a particular character and participate in a multitude of games of collaboration platform 120. The character may have some locked character settings. The character may participate in the multitude of games using, for example the same block model. The character may participate in different games where components of the block model are transformed in view of the respective morphing settings associated with the different games and the customized components (e.g., that give the character a unique identity) are maintained in the different games in view of the locked character settings.

The client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 via collaboration application 114 may connect to collaboration platform 120 at any given moment.

In implementations, each client device 110 may include an instance of collaboration application 114. In one implementation, the collaboration application 114 may be an application that allows users to use and interact with collaboration platform 120, such as control a virtual character in a virtual game hosted by collaboration platform 120, or view or upload content, such as images, video items, web pages, documents, and so forth. In one example, the collaboration application 114 may be a web browser that can access, retrieve, present, and/or navigate content (e.g., virtual character in a virtual environment, etc.) served by a web server. The collaboration application 114 may render, display, and/or present the content (e.g., a web page, a media viewer) to a user. In an implementation, the collaboration application 114 may also include an embedded media player (e.g., a Flash® player) that is embedded in a web page. In another example, the collaboration application 114 may be a standalone application (e.g., a mobile application, app, or a gaming program) that allows users to interact with collaboration platform 120. According to aspects of the disclosure, the collaboration application 114 may be a collaboration platform application for users to create, edit, upload content to the collaboration platform 120 as well as interact with collaboration platform 120. As such, the collaboration applications 114 may be provided to the client devices 110A and 110B by the server 130 or collaboration platform 120. In another example, the collaboration applications 114 may be applications that are downloaded from the server 130.

In implementations, a user may login to collaboration platform 120 via collaboration application 114. The user may access a user account by providing user account information (e.g., user name and password) where the user account is associated with one or more characters available to participate in one or more games 122 of collaboration platform 120.

In general, functions described in one implementation as being performed by the collaboration platform 120 can also be performed on the client devices 110A through 110B, or server 130, in other implementations if appropriate. In addition, the functionality attributed to a particular component can be performed by different or multiple components operating together. The collaboration platform 120 can also be accessed as a service provided to other systems or devices through appropriate application programming interfaces, and thus is not limited to use in websites.

In implementations, collaboration platform 120 may include messaging module 128. In implementations, messaging module 128 may be a system, application, or module that allows users to exchange electronic messages via a communication system, such as network 105. Messaging module 128 may be associated with collaboration application 114 (e.g., module of collaboration application 114 or be a separate application). In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination of multiple applications, among others.

In implementations, messaging module 128 may facilitate the exchange of electronic messages between users. For example, a user may be logged into a messaging application on client device 110A, and another user may be logged into a messaging application on client device 110B. The two users may start a conversation, such as an instant messaging conversation. Messaging module 128 may help facilitate the messaging conversation by sending and receiving the electronic messages between the users of collaboration platform 120.

For the sake of illustration, rather than limitation, character morphing module 140 is described as implemented on collaboration platform 120. In other implementations, character morphing module 140 may in part or wholly be implemented on client device 110. In other implementations, character morphing module 140 may in part or wholly be implemented on server 130. In other implementations, character morphing module 140 operating on one or more of client device 110, server 130, or collaboration platform 120 may work in conjunction to perform the operations described herein. In implementations, character morphing module 140 of client devices 110 may be a separate application or part of collaboration application 114 (e.g., add-in).

Although implementations of the disclosure are discussed in terms of collaboration platforms, implementations may also be generally applied to any type of social network providing connections between users.

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2:
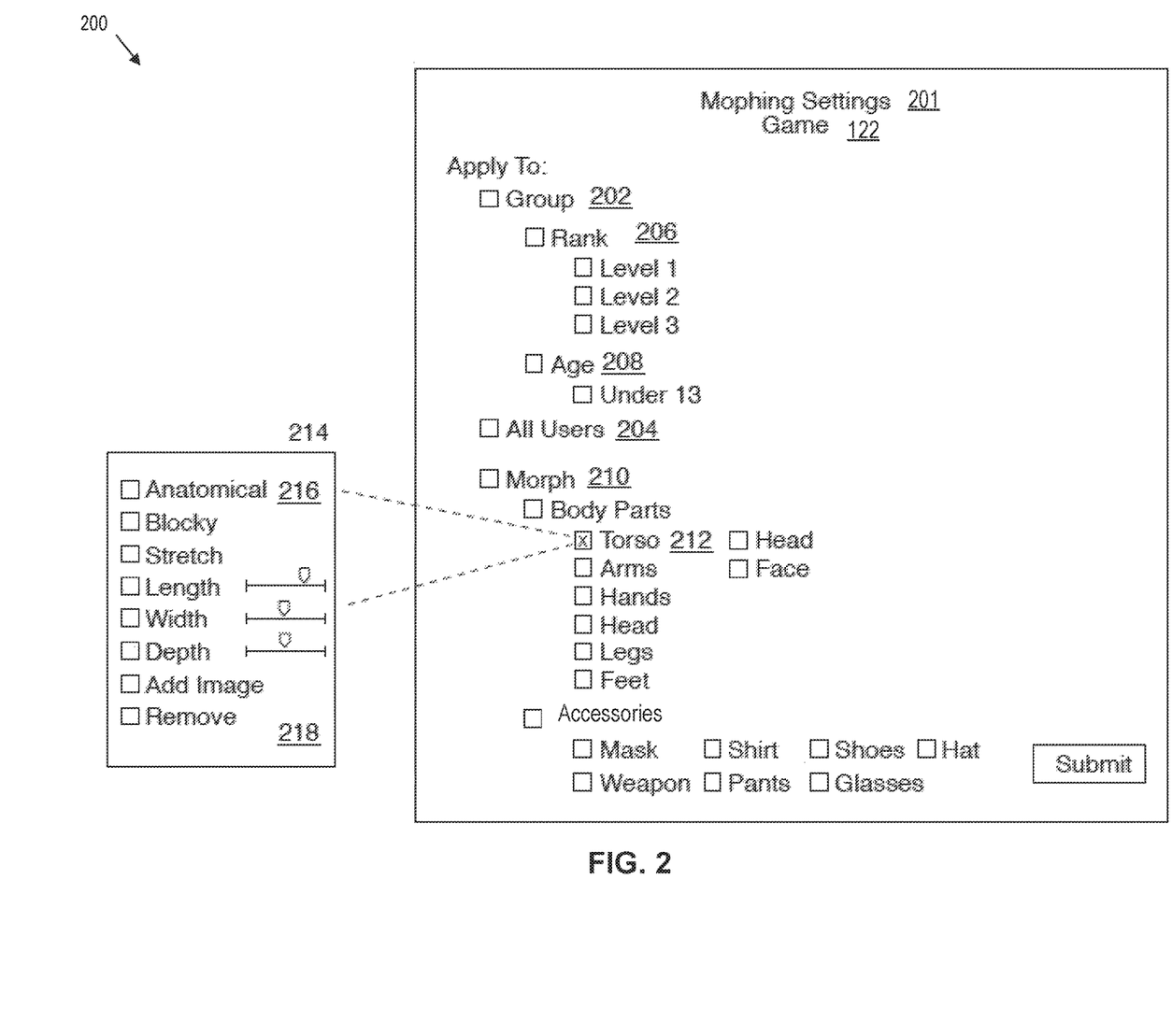
FIG. 2 is an illustration of a user interface to enable a user of a collaboration platform to control morphing settings, in accordance with implementations of the disclosure.

FIG. 2 is an illustration of a user interface to enable a user of a collaboration platform to control morphing settings, in accordance with implementations of the disclosure. Components of FIG. 1 are used to help illustrate FIG. 2. In implementations, user interface 200 may be accessed by an owning user to control the morphing settings 201 of a game 122 or gaming environment of a game 122. In implementations, user interface 200 may be displayed on the client device 110 via character morphing module 140. For purposes of illustration, rather than limitation, the morphing settings 201 of user interface 200 are described as to applying to a game 122. User interface 200 and morphing settings 201 are described as applying to games 122 for purposes of illustration, rather than limitation. In other implementations, the user interface 200, morphing settings 201, or other aspects of the disclosure may be applied to environments of games 122. For instance, a user may cross into multiple environments in a particular game, and each of the environments may have associated morphing settings 201. Morphing (also referred to "morph" herein) may generally refer to changing the appearance of a character from a first appearance to a second appearance. In implementations, a character may be morphed and displayed in a second appearance without being displayed in the first appearance. In implementations, morphing may include transforming, removing, adding, or keeping one or more components of a user's character.

In some implementations, user interface 200 provides a simplified user interface to allow users of all abilities to control morphing settings 201 for a particular game or environment. In implementations, the morphing settings 201 may be controlled by a user without using a programming language (or compilation by the user or an API). In other implementations, morphing settings 201 may be controlled using a programming language, such a scripting language.

In implementations, morphing settings 201 may apply to all playing users that access a game. For example, an owning user may select input control 204 ("All Users") to apply morphing settings 201 to all playing users accessing game 122. In some implementations, user interface 200 may provide for more granular control of the groups of users for which to apply morphing settings 201. For example, user interface 200 may include input controls, such as input control 202 ("Group"), to apply morphing settings 201 to one or more select groups of playing users. For instance, an owning user may select input control 206 ("Rank") to apply morphing settings 201 to playing users of different ranks (e.g., level 1, level 2, level 3, etc.), where rank reflects a rank of a playing user within a game 122 or rank of a playing user within collaboration platform 120, for example. In another example, an owning user may select input control 208 ("Age") to apply morphing settings 201 to playing users of different age groups (e.g., under 13, over 13, age 13, etc.). In some implementations, the morphing settings 201 may be controlled to be applied to one or more particular users by using an account name, for example.

In implementations, a particular game may have multiple morphing settings 201 that, for example, apply to different groups of playing users. For example, game 122 may have morphing settings 201 that apply to a group of playing users with a "Level 1" ranking, and other morphing settings that apply to another group of playing users with a "Level 2" ranking.

In other implementations, user interface 200 may provide for more granular control of the components of a playing user's character that are to be morphed (e.g., transformed, removed, added, or unchanged). For example, input control 210 ("Morph") may allow an owning user to select particular components, such as body parts or accessories, to morph. For example, input control 210 ("Morph") includes the ability select one or more body parts (e.g., torso, arms, hands, head, legs, feet, head, face, etc.) or select one or more accessories (e.g., mask, shirt, shoes, hat, weapon, pants, glasses, etc.). It may be noted that the components illustrated in FIG. 2 are provided for purposes of illustration, rather than limitation. In other implementations, fewer, more, or different components may be part of morphing settings 201.

In some implementations, selection of a particular input control, such as input control 212 ("Torso"), may trigger additional input controls, such as list 214, that allows for more granular control of the selected component. For example, user interface 200 shows input control 212 ("Torso") as selected, which triggers list 214 to be presented in user interface 200. List 214 provides additional input controls (e.g., anatomical, blocky, stretch, length, width, depth, add image, remove, etc.) to control the morphing of a playing user's torso. For instance, the selection of input control 216 ("Anatomical") may cause a playing user's torso to morph into an anatomically correct torso, while the selection of input control 218 ("Blocky") may cause a playing user's torso to morph into a block-like torso. In other examples, the input controls may include sliders to control the amount of change in the dimensions of the component, such as the torso. For instance, an owning user may control the length, width, or depth of a particular component. In still further examples, the owning user may add an image to the component or choose to remove the component from the playing user's character (e.g., remove the torso, hand, foot, ear, etc.).

In implementations, input controls 210 may be used to determine whether to transform, remove, add, or preserve a particular component of a playing user's character. For example, an unselected input control (e.g., "Head") may imply that the head of the playing user's character is not to be transform (e.g., preserved), and that the character settings for the character is to be used to determine the character's head. In another an example, a selected input control, such as input control 212 ("Torso") indicates that the torso of the playing user's character is to be transformed as specified by the morphing settings 201. In still another example, by selecting input control 212 ("Torso") and further selecting input control 218 ("Remove") indicates that the torso of the playing user's character is to be removed. In still another example, selecting an input control (e.g., hat) for a component that the playing user does not have (e.g., as specified by the character settings) may indicate that the particular component should be added to the playing user's character. It may be noted that in other implementations that other input controls may be provided to determine whether to transform, remove, add, or preserve a particular component of a playing user's character. For example, a separate input control may be provided for each action of transform, remove, add, or preserve.

In some implementations, collaboration platform 120 (or owning users) may determine that some components of a playing user's character are not to be changed and may limit morphing settings 201 for a particular component. In implementations, collaboration platform 120 may limit morphing settings 201 for particular components that distinguish characters from one another (e.g., hair, face type, skin, t-shirt, etc.). In some implementations, morphing settings 201 may limit morphing settings 201 by greying out particular input controls or by not including input controls for some components, for example. In some implementations, the creator may limit the morphing settings 201 available to be controlled by other users having administrative control of the morphing settings 201. It may be noted that in some implementations, the owning user may give administrative control to one or more playing users.

In implementations, the owning user may submit morphing settings 201 to collaboration platform 120 by, for example, hitting the "submit" input control, where the morphing settings 201 are received, saved, and associated with the particular game. Collaboration platform 120 may associated the morphing settings 201 with the game 122 by for example, creating a record (e.g., table) for game 122 that indicates that morphing settings 201 are associated with game 122 (e.g., set a flag, etc.), and a pointer to the morphing settings 201 stored in data store 106.

In some implementations, the owning user may submit morphing settings 201 and the morphing settings 201 may be applied to playing users during runtime of the applicable game 122. For instance, game 122 may be executing and have playing users participating in the game 122. The owning user may submit morphing settings 201 that apply to all users, and the users' characters may be morphed during gameplay. In other implementations, the morphing settings 201 may be applied at runtime but affect new users accessing game 122 rather than the currently participating users.

Figure 3:
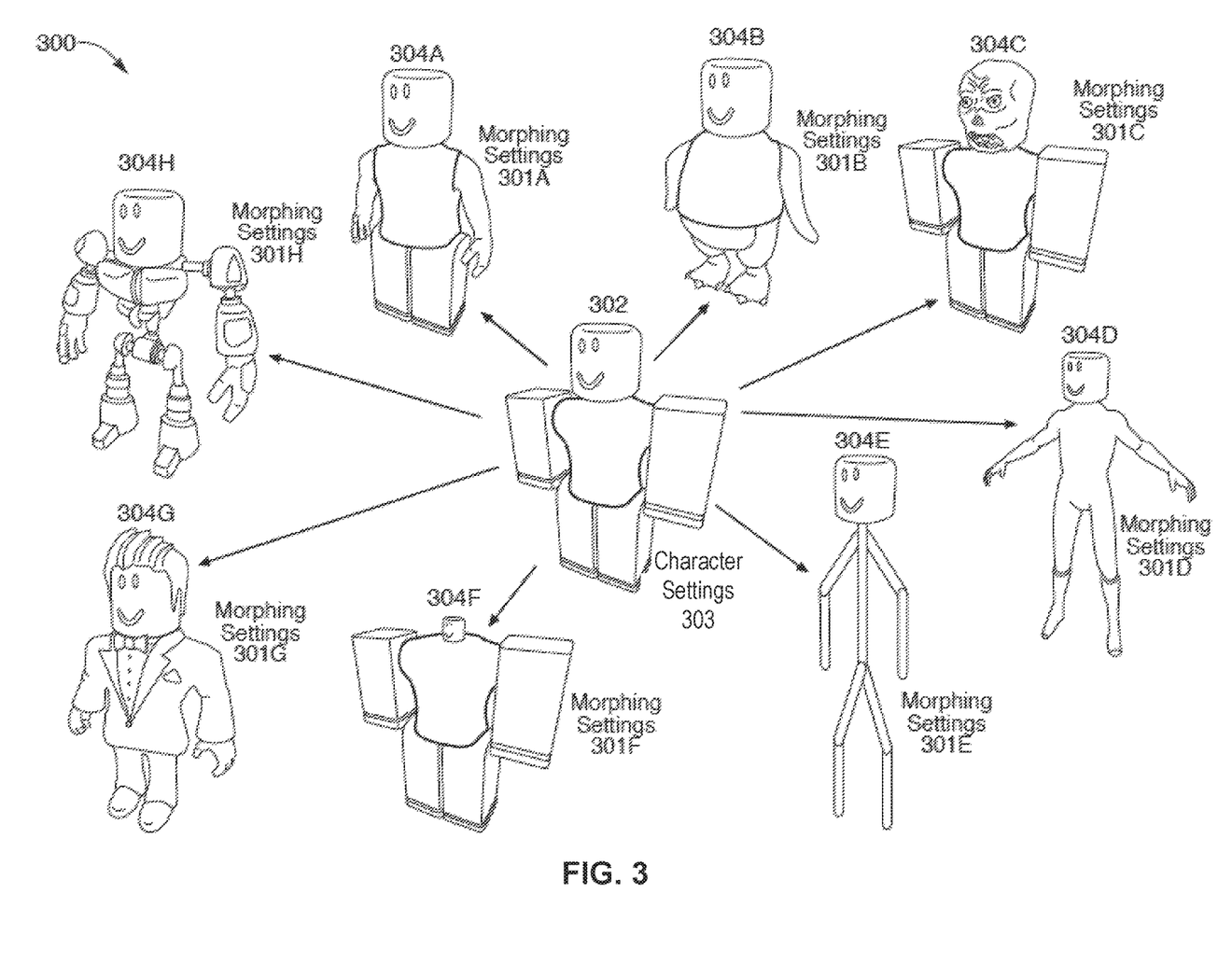
FIG. 3 is a diagram illustrating morphed characters, in accordance with some implementations of the disclosure.

FIG. 3 is a diagram illustrating morphed characters, in accordance with some implementations of the disclosure. Diagram 300 shows character 310 (center) un-morphed and rendered using character settings 303. As illustrated, character 302 includes blocky arms and legs, a cylindrical head, a realistic torso, and a happy face type. The torso is covered with sleeveless t-shirt as illustrated by the bold lines. Diagram 300 further shows character 302 as a morphed character 304 under various morphing settings 301. It may be noted that the different types of morphing illustrated in diagram 300 is provided for purposes of illustration rather than limitation. In other implementations, characters 304 may be morphed in different ways and rendered with different appearances by controlling morphing settings 301. Several examples of morphing character 302 with respect to morphing settings 301 are described below.

In one example, character 304A is morphed with respect to morphing settings 301A. As illustrated, character 304A has a changed or transformed torso and arms, and has added hands. The remaining components of character 304A (e.g., shirt, legs, face and head) have been preserved with respect to the character settings 303 of character 302. In another example, character 304B is morphed with respect to morphing settings 301B. As illustrated, character 304B has a preserved face, head, and shirt, while the other components have changed. It may be noted that the shirt for characters 304A and 304B has been preserved, but scaled to fit the transformed torso. Also illustrated, character 304B has been generated with a body of animal (e.g., penguin).

In another example, character 304C is morphed with respect to morphing settings 301C. As illustrated, character 304C has a transformed head and face, while the remaining components of character 304C remain consistent with the character settings 303 of character 302. In an example, character 304D is morphed with respect to morphing settings 301D. As illustrated, character 304D has added hands and boots, removed the shirt, and transformed the remaining components (e.g., torso, arms, head, face, and legs) into anatomically correct equivalents. In still another example, character 304E is morphed with respect to morphing settings 301E. As illustrated, character 304E has preserved or retained the head and face, removed the shirt, and the remaining body parts have been transformed into a stick figure equivalent and stretched.

In an example, character 304F is morphed with respect to morphing settings 301F. As illustrated, the head and face has been transformed smaller (e.g., shrunk) while the remaining components have been preserved. In another example, character 304G is morphed with respect to morphing settings 301G. As illustrated, the head and face of character 304G have been preserved, clothing (e.g., tuxedo and tuxedo accessories replacing the shirt), feet, hands, and hair have been added, and the body has been transformed into a more anatomically correct (e.g., pseudo-anatomically correct) proportions. In an example, character 304H is morphed with respect to morphing settings 301H. As illustrated, character 304H has preserved the head and face, the shirt has been removed, and the body has been transformed into a robot.

Figure 4:
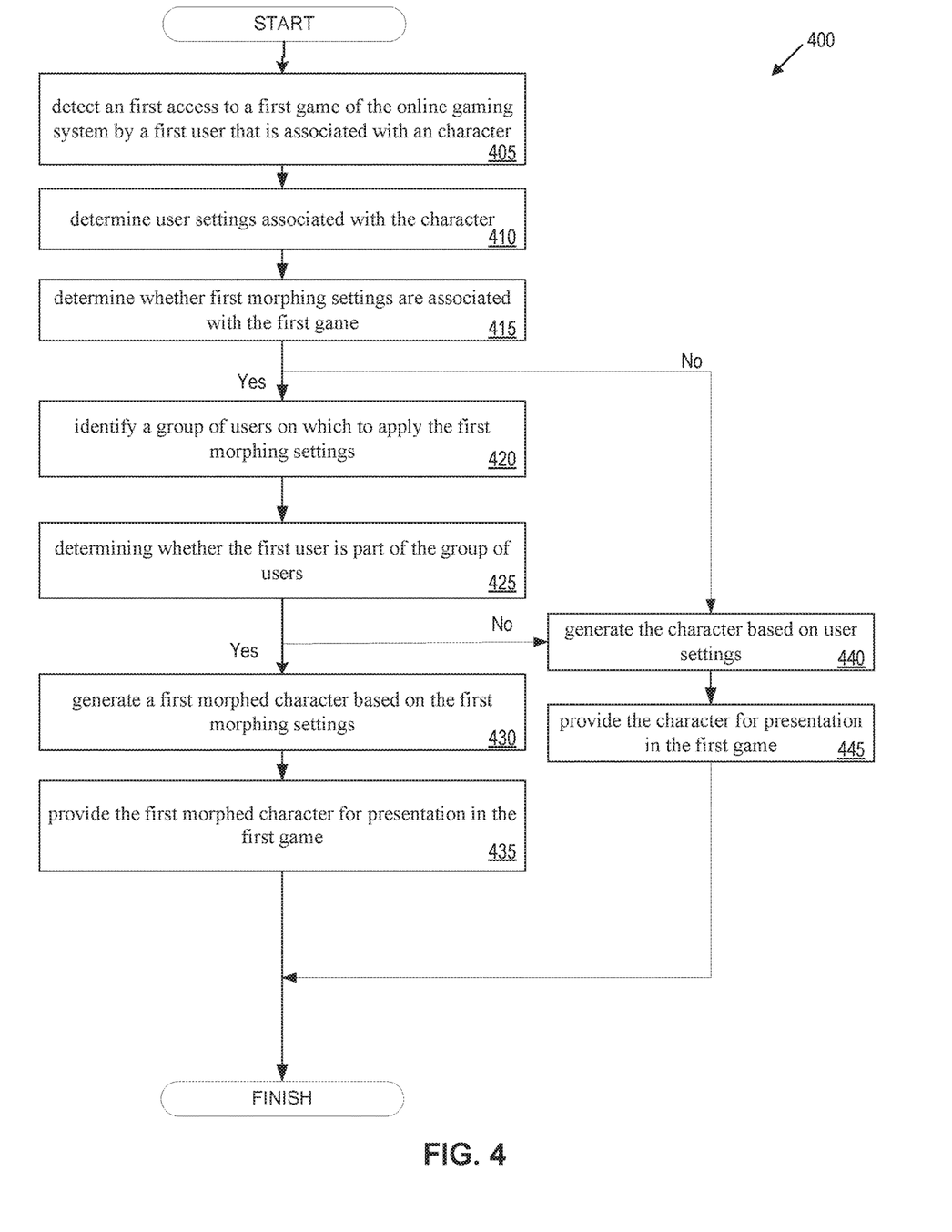
FIG. 4 is a flow diagram illustrating method for morphing a character in a collaboration platform, in accordance with some implementations of the disclosure.

FIG. 4 is a flow diagram illustrating method 400 for morphing a character of a collaboration platform, in accordance with some implementations of the disclosure. Method 400 may be performed by processing logic that includes hardware (e.g., circuitry, dedicated logic, programmable logic, microcode), software (e.g., instructions run on a processing device to perform hardware simulation), or a combination thereof. In some implementations, character morphing module 140 executing at collaboration platform 120, client device 110A, client device 110B or combination thereof may perform some or all the operations. Elements of FIG. 1-3 may be used to help illustrated method 400. It may be appreciated that the in some implementations, method 400 may include the same, different, fewer, or greater operations performed in any order.

Method 400 begins at block 405 where processing logic detects an access to a game 122 of collaboration platform 120 (e.g., online gaming system) by a user. The user is associated with a character that may be selected by the user. For example, a user may select a game from a game catalog. Responsive to the selection, a game identifier (and a user identifier, such an account identifier) may be sent from the client device 110 to collaboration platform 120 signifying an access by the user to game 122.

In other implementations, the detected access may be to an environment within a game 122. For instance, the character may travel from a first environment within game 122 to a second environment within the same game 122. Similarly, collaboration platform 120 may receive from client device 110 (or from within collaboration platform 120) an indication of an access (e.g. environment identifier and use identifier) of the second environment by the user.

At block 410, processing logic determines character settings associated with the character. In some implementations, the playing user may choose a character to use for gameplay in game 122. The chosen character may have settings (e.g., character settings) that are determine the appearance of components of the character and used render the character for display on the user's client device 110. In some implementations, the character settings are associated (e.g., linked or otherwise recorded) with the particular character.

At block 415, processing logic determines whether morphing settings 301 are associated with game 122. For instance, collaboration platform 120 identifies the game 122 using the game identifier and determines from the record whether morphing settings 301 are associated with game 122 (e.g., determines whether a flag indicating morphing settings 301 are associated with game 122 is set).

Responsive to determining morphing settings 301 are not associated with game 122, processing logic moves to block 440, where processing logic generates or renders the character based on the character settings. At block 445, processing logic provides the character for presentation in the game 122 for display on a user interface of the client device 110 of the playing user.

Responsive to determining morphing settings 301 are associated with game 122, processing logic moves to block 420 where processing logic identifies a group of users on which to apply the morphing settings 301. For example, collaboration platform 120 may retrieve the morphing settings 301 associated with the game 122, and determine which group(s) of users the morphing settings 301 are to be applied (e.g., all users, users of a particular rank or age group, etc.). At block 425, processing logic determines whether the user is part of the group of users identified by the morphing settings 301. For example, the user identifier, such as an account identifier, may be used to obtain group information that enables collaboration platform 120 to determine whether the user is part of a group specified by the morphing settings 301 (e.g., user's age, user's rank, etc.). In another example, responsive to determining that the morphing settings 301 apply to all users, processing logic may skip block 425.

Responsive to determining that the user is not part of the group of users specified by the morphing settings 301, processing logic moves to block 440 as described above.

Responsive to determining that the user is part of the group of users specified by the morphing settings 301, processing logic moves to block 430 where processing logic generates or renders a morphed character based on morphing settings 301.

In implementations, generating the morphed character based on morphing settings 301 may include identifying a first set of components of the character to transform. For example, processing logic may identify from the morphing settings 301 the components selected for transformation. In implementations, generating the morphed character may also include identifying a second set of components of the character to preserve. For example, processing logic may identify from morphing settings 301 the components not selected to be transformed as the components to be preserved. In implementations, generating the morphed character includes identifying a third set of components of the character to add based on the morphing settings 301. For example, a component that has been selected via morphing settings 301 and that is not included in the user settings may be added to the morphed character. In some implementations, processing logic may identify a fourth set of components to remove from the character based on the morphing settings 301. For example, the morphing settings 301 may include an input control that if selected removes a particular component of the character if the component is identified in the user settings as being part of the character.

In implementations, generating the morphed character also includes transforming the first set of components based on the morphing settings 301. For example, the preserved components may be generated based on the character settings and the transformed components may be initially generated based on the character settings and subsequently scaled based on the morphing settings 301.

In implementations, generating the morphed character also includes assembling the transformed first set of components with the preserved second set of components to generate the morphed character. In some implementations, assembling may also include scaling the preserved components to fit transformed components, if applicable. In implementations, assembling the morphed character may include assembling the morphed character with additional components (e.g., the components identified as component(s) to add) or assembling the morphed character without components that are identified as components to be removed. It may be noted that a set may refer to one or more, such as one or more components.

In some implementations, transforming the components specified by the morphing settings 301 includes identifying the dimensions (e.g., length, width, or depth) of the components as defined by the user settings. Based on the morphing settings 301, the dimensions of the components are scaled and locations of the joints determined. A joint may be the area of a first component that joins to another component and at which movement (of at least the first component) along one or more axis may be performed. The scaled body parts may be assembled with any other transformed, added, or preserved body parts at the joints. The accessories, such as clothing, may by overlaid on the assembled body and scaled appropriately for the transformed body parts (e.g., stretched (or shrunk) to predetermined attachment point on the body. It may be noted that components, such as accessories, may be preserved and appropriately scaled to fit other transformed components, such as body parts.

At block 435, processing logic provides the morphed character for presentation in the game 122 via a user interface (e.g., collaboration application 114).

In some implementations, processing logic may generate the character using the character settings (at or subsequent block 410) and provide the character for display on client device 110. In some implementations, if processing logic subsequently determines that the character is to be morphed based on morphing settings 301 (e.g., at block 235), the character may be morphed and the morphed character may be displayed on client device 110. In some implementations, the character may instantaneously morph, such as from an initial state (character based on user settings) to a final state (character based on morphing settings), and provided for display as such. In other implementations, the character may morph in multiple states that include at least one of the initial state, one or more intermediate states, and the final state and provided for display as such. For example, a process of character morphing may be provided for display to client device 110. For instance, the arms and the legs may be morphed based on the morphing settings 301. Processing logic may provide for display the character with a left morphed arm, subsequently provide for display the character with both morphed arms, subsequently provide the character with both morphed arms and a morphed left leg, and so forth. In other implementations, greater granularity of the morphing process may be provided for display to the client device 110. For instance, processing logic may provide for display the character with a partially morphed left arm (e.g., length), subsequently provide for display the character with a less partially morphed left arm (e.g., length and width), and subsequently provide for display the character with a fully morphed arm (e.g., length, width, and depth).

In still other implementations, the user may access another game of the online gaming system. Similar as described above, processing logic may determine whether morphing settings are associated with the other game. Responsive to determining that the morphing settings are associated with the other game, processing logic may generate a new morphed character based on the morphing settings of the other game in a similar manner as described above and provide the new morphed character for presentation in the other game via the user interface.

In some implementations, the user may access a different environment (e.g., different from the initial environment) in game 122. For example, the user may cross a virtual boundary that delineates a first environment from a second environment in game 122. In some implementations, the two environments may have different owning users that set different morphing settings for each environment (or the same owning user that sets different morphing settings). Processing logic may detect the access to second environment in the game (e.g., receives an indication that the user crosses the boundary or threshold). Processing logic may determine whether morphing settings are associated with the second environment. If morphing setting are associated with the second environment, processing logic generates a morphed character based on the morphing settings of the second environment and provides the morphed character for presentation in the environment of the new game. If no morphing settings are associated specifically with the second environment, the character is presented using the previous settings (e.g., morphing settings of the game, morphing settings of the first environment, etc.)

Figure 5:
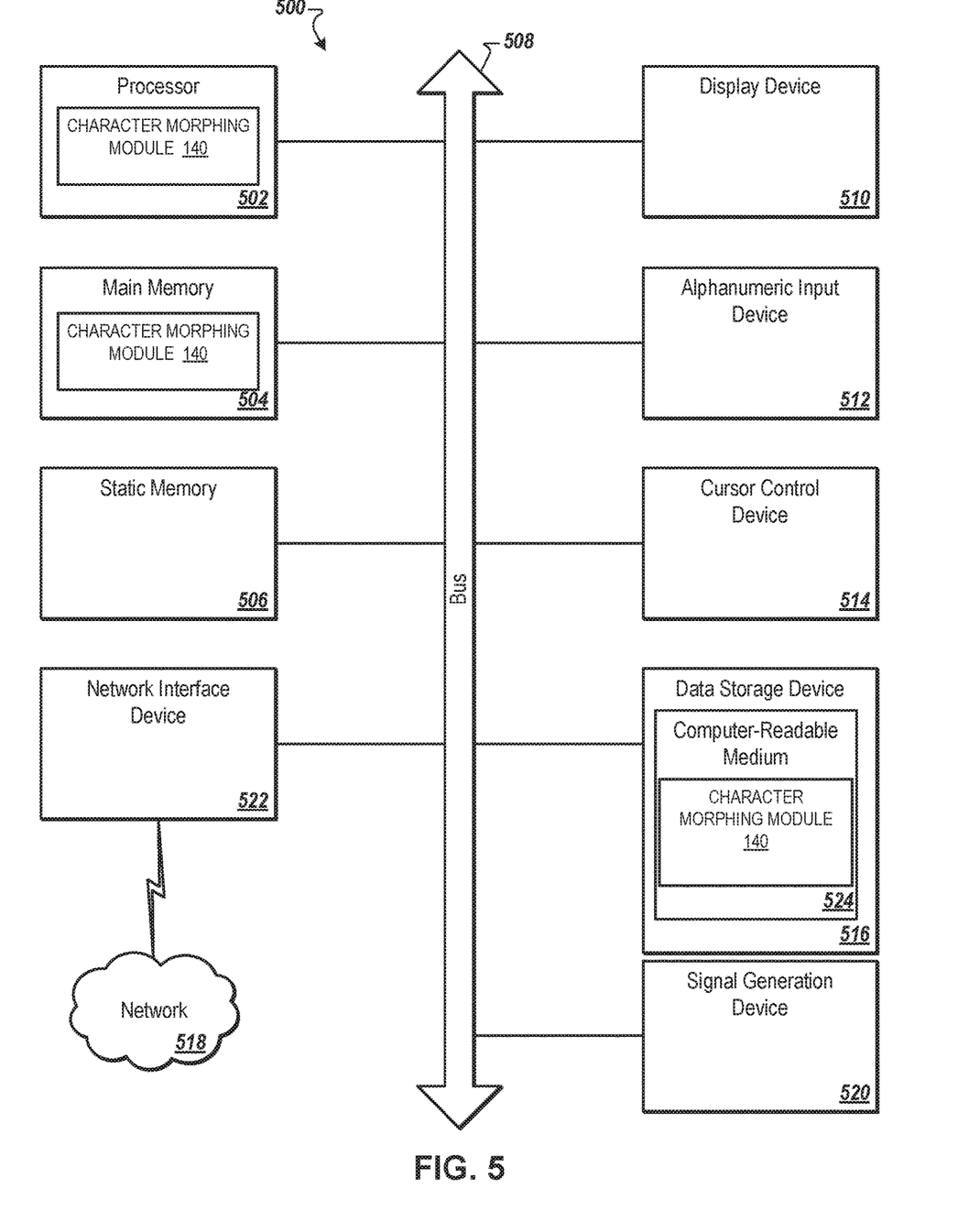
FIG. 5 is a block diagram illustrating an exemplary computer system, in accordance with implementations of the disclosure.

FIG. 5 is a block diagram illustrating an exemplary computer system 500, in accordance with implementations. The computer system 500 executes one or more sets of instructions that cause the machine to perform any one or more of the methodologies discussed herein. Set of instructions, instructions, and the like may refer to instructions that, when executed computer system 500, cause computer system 500 to perform one or more operations of character morphing module 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and the character morphing module 140 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 and character morphing module 140 embodying any one or more of the methodologies or functions described herein. The sets of instructions of the system architecture 100 and character morphing module 140 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "detecting," "generating," "determining," "providing," "assembling," "scaling," "providing," "identifying," "associating," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

What is claimed is:

1. An online gaming system, comprising:
a memory; and
a processing device, coupled to the memory, to:
receive a user selection of character settings for a character associated with a playing user of the online gaming system, wherein the character settings specify a plurality of components of the character and are used to render the character for display at the online gaming system, wherein the plurality of components comprise body part components and accessory components;
provide, to a first client device associated with an owning user of a first game, a graphical user interface to allow the owning user to specify first morphing settings associated with the first game of the online gaming system, wherein the first morphing settings identify first components of the plurality of components specified by the character settings that are to be changed and second components of the plurality of components specified by the character settings that are to be unchanged responsive to an access to the first game by the character;
receive, from the first client device, the first morphing settings specified by the owning user via the graphical user interface to change the first components comprising at least one of the body part components of the character;
detect a first access to the first game of the online gaming system by the character associated with the playing user;
responsive to detecting the first access, determine whether the first morphing settings have been specified by the owning user of the first game;
determine that the first components are permitted to be changed;
responsive to determining the first morphing settings have been specified by the owning user of the first game and determining that the first components are permitted to be changed, generate a first morphed character by changing the first components comprising the at least one of the body part components of the character associated with the playing user in accordance with the first morphing settings specified by the owning user; and provide the first morphed character for presentation in the first game.

2. The online gaming system of claim 1, wherein to generate the first morphed character, the processing device to:
identify a first set of the plurality of components of the character associated with the playing user to transform;
identify a second set of the plurality of components of the character associated with the playing user to preserve in accordance with the character settings;
transform the first set of the plurality of components in accordance with the first morphing settings; and
assemble the transformed first set of components with the preserved second set of components to generate the first morphed character.

3. The online gaming system of claim 2, wherein to transform the first set of the plurality of components in accordance with the first morphing settings, the processing device to:
scale the first set of the plurality of components in accordance with the first morphing settings.

4. The online gaming system of claim 2, wherein to generate the first morphed character, the processing device to:
identify an additional set of components to add to the character associated with the playing user, wherein the first morphed character is generated by assembling the transformed first set of components with the preserved second set of components and the additional set of components.

5. The online gaming system of claim 1, the processing device further to:
identify a group of users on which to apply the first morphing settings; and
determine whether the playing user is part of the group of users identified by the first morphing settings, wherein the first morphed character is generated responsive to determining the playing user is part of the group of users.

6. The online gaming system of claim 1, the processing device further to:
responsive to detecting the first access, determine the character settings associated with the character associated with the playing user; and
provide the character associated with the playing user for presentation in the first game in accordance with the character settings.

7. The online gaming system of claim 1, the processing device further to:
detect a second access to a second game of the online gaming system by the character associated with the playing user;
determine whether second morphing settings are associated with the second game;
responsive to determining the second morphing settings are associated with the second game, generate a second morphed character in accordance with the second morphing settings; and
provide the second morphed character for presentation in the second game.

8. The online gaming system of claim 1, the processing device further to:
responsive to determining that the first morphing settings have not been specified by the owning user of the first game, generate the character associated with the playing user in accordance with the character settings; and
provide the character associated with the playing user for presentation in the first game.

9. The online gaming system of claim 1, the processing device further to:
detect an access to an environment within the first game by the first morphed character associated with the playing user;
determine whether third morphing settings are associated with the environment of the first game;
responsive to determining the third morphing settings are associated the environment of the first game, generate a third morphed character in accordance with the third morphing settings; and
provide the third morphed character for presentation in the environment of the first game.

10. The online gaming system of claim 1, the processing device further to:
store the first morphing settings; and
associate the first morphing settings with the first game.

11. A method, comprising:
receiving a user selection of character settings for a character associated with a playing user of an online gaming system, wherein the character settings specify a plurality of components of the character and are used to render the character for display at the online gaming system, wherein the plurality of components comprise body part components and accessory components;
providing, to a first client device associated with an owning user of a first game, a graphical user interface to allow the owning user to specify first morphing settings associated with the first game created by the owning user, wherein the first morphing settings identify first components of the plurality of components specified by the character settings that are to be changed and second components of the plurality of components specified by the character settings that are to be unchanged responsive to an access to the first game by the character;
receiving, from the first client device, the first morphing settings specified by the owning user via the graphical user interface to change at least one of the body part components of the characters;
detecting, by a processing device, a first access to the first game of the online gaming system by the character associated with the playing user;
responsive to detecting the first access, determining whether the first morphing settings have been specified by the owning user of the first game;
determining that the first components are permitted to be changed;
responsive to determining the first morphing settings are associated with the first game and determining that the first components are permitted to be changed, generating a first morphed character by changing the first components comprising the at least one of the body part components of the character associated with the playing user in accordance with the first morphing settings specified by the owning user; and
providing the first morphed character for presentation in the first game.

12. The method of claim 11, wherein generating the first morphed character comprises:
identifying a first set of the plurality of components of the character associated with the playing user to transform;
identifying a second set of the plurality of components of the character associated with the user to preserve in accordance with the character settings;

transforming the first set of the plurality of components in accordance with the first morphing settings; and assembling the transformed first set of components with the preserved second set of components to generate the first morphed character.

13. The method of claim 12, wherein generating the first morphed character further comprises:

identifying an additional set of components to add to the character associated with the playing user, wherein the first morphed character is generated by assembling the transformed first set of components with the preserved second set of components and the additional set of components.

14. The method of claim 11, further comprising:

identifying a group of users on which to apply the first morphing settings; and determining whether the playing user is part of the group of users identified by the first morphing settings, wherein the first morphed character is generated responsive to determining the playing user is part of the group of users.

15. The method of claim 11, further comprising:

responsive to determining that the first morphing settings have not been specified by the owning user of the first game, generating the character associated with the playing user in accordance with the character settings; and providing the character for presentation in the first game.

16. A non-transitory computer-readable medium comprising instructions that, when executed by a processing device, cause the processing device to perform operations comprising:

receiving a user selection of character settings for a character associated with a playing user of an online gaming system, wherein the character settings specify a plurality of components of the character and are used to render the character for display at the online gaming system, wherein the plurality of components comprise body part components and accessory components;

providing, to a first client device associated with an owning user of a first game, a graphical user interface to allow the owning user to specify first morphing settings associated with the first game of the online gaming system, wherein the first morphing settings identify first components of the plurality of components specified by the character settings that are to be changed and second components of the plurality of components specified by the character settings that are to be unchanged responsive to an access to the first game by the character;

receiving, from the first client device, the first morphing settings specified by the owning user via the graphical user interface to change the first components comprising at least one of the body part components of the character;

detecting, by the processing device, a first access to the first game of the online gaming system by the character associated with the playing user;

responsive to detecting the first access, determining whether the first morphing settings have been specified by the owning user of the first game;

determining that the first components are permitted to be changed;

responsive to determining the first morphing settings have been specified by the owning user of the first game and determining that the first components are permitted to be changed, generating a first morphed character by changing the first components comprising the at least one of the body part components of the character associated with the playing user in accordance with the first morphing settings specified by the owning user; and providing the first morphed character for presentation in the first game.

17. The non-transitory computer-readable medium of claim 16, wherein generating the first morphed character, the operations further comprising:

identifying a first set of the plurality of components of the character associated with the playing user to transform;

identifying a second set of the plurality of components of the character associated with the playing user to preserve in accordance with the character settings;

transforming the first set of the plurality of components in accordance with the first morphing settings; and assembling the transformed first set of components with the preserved second set of components to generate the first morphed character.

18. The non-transitory computer-readable medium of claim 16, the operations further comprising:

identifying a group of users on which to apply the first morphing settings; and determining whether the playing user is part of the group of users identified by the first morphing settings, wherein the first morphed character in accordance with the first morphing settings is generated responsive to determining the playing user is part of the group of users.

19. The non-transitory computer-readable medium of claim 16, the operations further comprising:

responsive to determining that the first morphing settings have not been specified by the owning user of the first game, generating the character associated with the playing user in accordance with the character settings; and providing the character associated with the playing user for presentation in the first game.

* * * * *